US010553040B2

(12) United States Patent
Lei et al.

(10) Patent No.: US 10,553,040 B2
(45) Date of Patent: Feb. 4, 2020

(54) METHOD AND APPARATUS FOR ENHANCED TELEMATICS SECURITY THROUGH SECONDARY CHANNEL

(71) Applicant: FORD GLOBAL TECHNOLOGIES, LLC, Dearborn, MI (US)

(72) Inventors: Oliver Lei, Windsor (CA); Allen R. Murray, Lake Orion, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 702 days.

(21) Appl. No.: 15/047,236

(22) Filed: Feb. 18, 2016

(65) Prior Publication Data

US 2017/0243408 A1 Aug. 24, 2017

(51) Int. Cl.
*G08C 17/02* (2006.01)
*G07C 5/00* (2006.01)
*H04L 29/08* (2006.01)
*H04W 12/06* (2009.01)

(52) U.S. Cl.
CPC ............ *G07C 5/008* (2013.01); *G08C 17/02* (2013.01); *H04L 67/125* (2013.01); *H04W 12/06* (2013.01); *G08C 2201/42* (2013.01); *G08C 2201/60* (2013.01)

(58) Field of Classification Search
None
See application file for complete search history.

(56) References Cited

U.S. PATENT DOCUMENTS

| 5,937,065 | A | * | 8/1999 | Simon | B60R 25/24 380/262 |
| 6,992,982 | B1 | * | 1/2006 | Meyer | H04L 69/326 370/230 |
| 7,383,056 | B2 | * | 6/2008 | Matsubara | B60R 25/2009 340/426.13 |
| 8,731,155 | B2 | | 5/2014 | Chesnutt et al. | |
| 2005/0258936 | A1 | * | 11/2005 | Ghabra | B60R 25/245 340/5.72 |
| 2013/0149998 | A1 | | 6/2013 | Yi et al. | |
| 2013/0212659 | A1 | * | 8/2013 | Maher | H04L 63/06 726/6 |
| 2014/0340193 | A1 | * | 11/2014 | Zivkovic | G07C 9/00111 340/5.61 |
| 2015/0166007 | A1 | | 6/2015 | Hong | |
| 2015/0172919 | A1 | | 6/2015 | Basnayake et al. | |
| 2015/0271201 | A1 | | 9/2015 | Ruvio et al. | |
| 2016/0225260 | A1 | * | 8/2016 | Lin | G08G 1/096791 |

FOREIGN PATENT DOCUMENTS

EP 1024626 A1 * 8/2000 ........... H04B 13/005

* cited by examiner

Primary Examiner — Kevin P Mahne
(74) Attorney, Agent, or Firm — Michael Spenner; Brooks Kushman P.C.

(57) ABSTRACT

A system includes a processor configured to wirelessly receive a vehicle system command from a remote source over a first communication channel. The processor is also configured to open a second communication channel with an apparent command-originating source, responsive to receiving the command. The processor is further configured to request, over the second communication channel, verification that the command originated from the apparent command-originating source and execute the command responsive to command-origin verification.

20 Claims, 2 Drawing Sheets

METHOD AND APPARATUS FOR ENHANCED TELEMATICS SECURITY THROUGH SECONDARY CHANNEL

TECHNICAL FIELD

The illustrative embodiments generally relate to a method and apparatus for enhanced telematics security through use of a secondary data channel.

BACKGROUND

Telematics systems provide a communication medium so vehicle computing systems can communicate with remote entities and networks to send and receive data. These systems can be used to receive commands to remotely configure or control some aspect of a vehicle. Security features with respect to received control commands attempt to ensure that a malicious entity does not send an unapproved command to reconfigure or control a vehicle or vehicle system. Current security features include verification of data content. However, it is possible that data content could be spoofed by a sophisticated hacker.

SUMMARY

In a first illustrative embodiment, a system includes a processor configured to wirelessly receive a vehicle system command from a remote source over a first communication channel. The processor is also configured to open a second communication channel with an apparent command originating source, responsive to receiving the command. The processor is further configured to request, over the second communication channel, verification that the command originated from the apparent command originating source and execute the command responsive to verification of a command origin.

In a second illustrative embodiment, a system includes a processor configured to request verification of a control command over a second channel that was wirelessly received over a first channel responsive to receipt of the control command over the first channel and execute the control command upon verification of the control command over the second channel.

In a third illustrative embodiment, a computer-implemented method includes receiving a command verification request over a newly established wireless communication channel at a remote command originating source. The method also includes receiving command identifying data relating to a command wirelessly received by a vehicle. The method further includes determining if the command was sent from the remote command originating source and providing command verification to the vehicle based on the determining.

DETAILED DESCRIPTION

As required, detailed embodiments are disclosed herein; however, it is to be understood that the disclosed embodiments are merely illustrative and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

Figure 1:
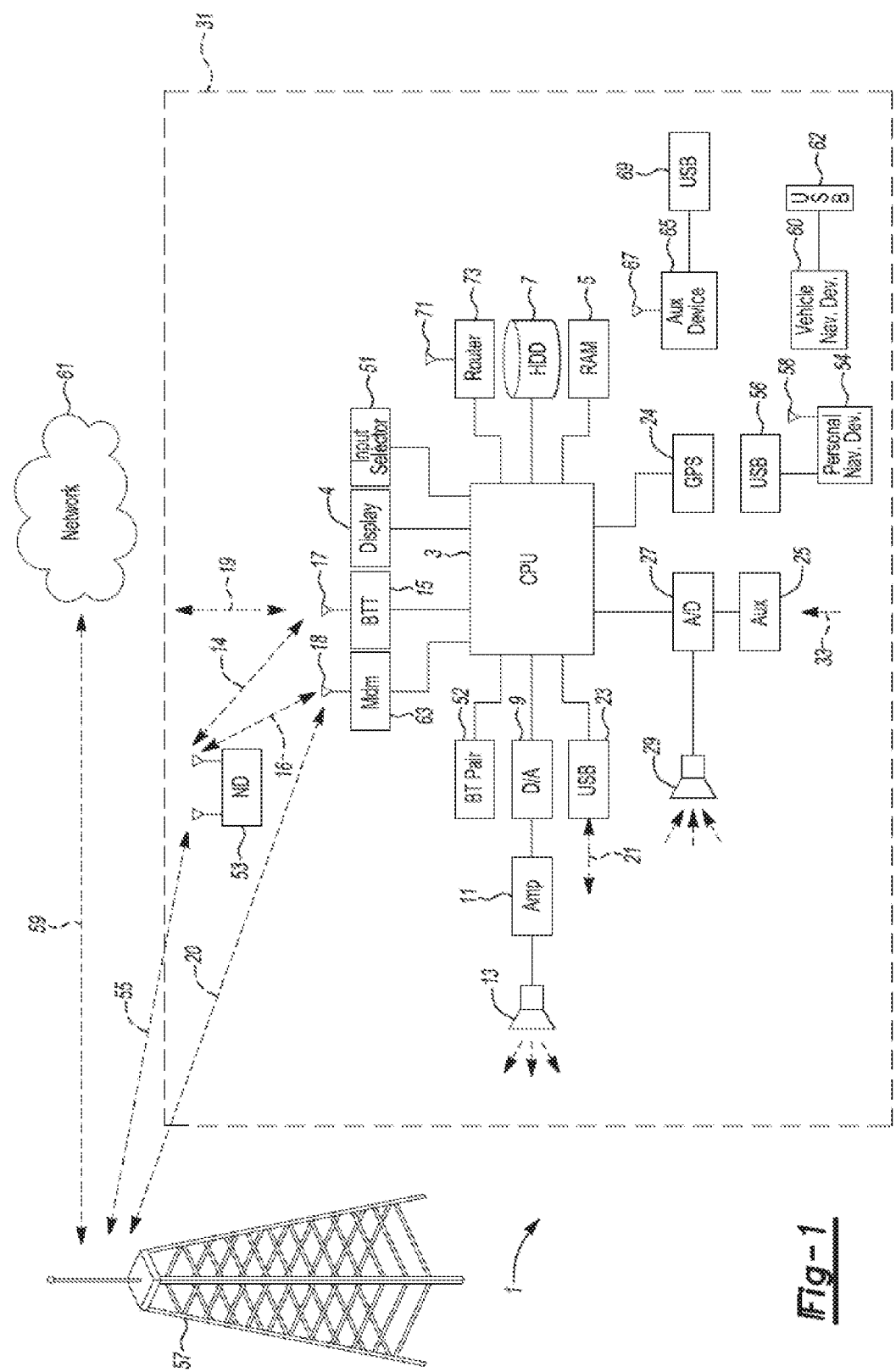
FIG. 1 shows an illustrative vehicle computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through button presses and/or a spoken dialog system with automatic speech recognition and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory. In general, persistent (non-transitory) memory can include all forms of memory that maintain data when a computer or other device is powered down. These include, but are not limited to, HDDs, CDs, DVDs, magnetic tapes, solid state drives, portable USB drives and any other suitable form of persistent memory.

The processor is also provided with a number of different inputs allowing the user to interface with the processor. In this illustrative embodiment, a microphone 29, an auxiliary input 25 (for input 33), a USB input 23, a GPS input 24, screen 4, which may be a touchscreen display, and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives a signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Representative communication between the nomadic device and the BLUETOOTH transceiver is represented by signal 14. Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), and Space-Domain Multiple Access (SDMA) for digital cellular communication. In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary devices 65 may include, but are not limited to, personal media players, wireless health devices, portable computers, and the like.

Also, or alternatively, the CPU could be connected to a vehicle based wireless router 73, using for example a WiFi (IEEE 803.11) 71 transceiver. This could allow the CPU to connect to remote networks in range of the local router 73.

In addition to having representative processes executed by a vehicle computing system located in a vehicle, in certain embodiments, the processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

In each of the illustrative embodiments discussed herein, a representative, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve various features and functions. Additional steps may be added or removed from the illustrated processes as desired.

Under current security paradigms for ensuring, or attempting to ensure, malicious attacks on a vehicle are unsuccessful, data content verification processes are undertaken. A potential issue with these processes, however, is that a hacker could "spoof" (imitate) verifiable data, and a system could potentially falsely verify certain content as legitimate or authorized. Also, to the extent that verification is done between a sending entity and a vehicle system over an existing channel, a hacker could intercept verification commands and spoof responses, or simply spoof the remote entity altogether (acting as an approved remote entity).

If, for example, commands to a vehicle are required to originate from an approved call center, a hacker could pretend (digitally) to be the call center and intercept and respond to verification requests sent in response to a request to control some aspect of the vehicle. In the illustrative embodiments, the vehicle determines a command-originating entity (either by design, inclusion of an identifier in the command, etc) and utilizes a new communication channel and session with the apparent command-originating entity. This strategy ensures that the legitimate entity actually originated the command and that the received command was not spoofed by a hacker or other unauthorized third party.

In some applications, commands may include source identification. Instead of simply responding to the source in response to the command being received using the same communication channel, the system will open a new communication channel with the previously established legitimate source as identified in the command to verify that the command actually originated from that source. If a hacker or other unauthorized third party is pretending to be the source when sending the command, the new communication channel/session with the legitimate source should reveal that the command did not actually originate from the source indicated in the command. It would be much more difficult, if not impossible, for a hacker to intercept and respond to this verification communication originating from the vehicle over a new channel to a known legitimate source.

In another example, only commands from certain sources may be permitted. Again, a source identification may be used, or if a single or limited number of sources were permitted, channels to each permissible source may be established to determine which known source, if any, originated a command. In this model as well, it is far more difficult for a hacker to intercept the new communication and maintain a masquerade as the "source."

To improve security, a secondary data channel is opened with a known or identified source of a command/request. This channel is distinct and separate from the channel over which the command/request was originally received. The channel can be of any suitable communication technology, including, but not limited to, TCP/IP, SMS, unstructured supplementary service data (USSD), session initiation protocol (SIP), etc. After the identified or known source verifies that the command did, in fact, originate from that source, the command can be processed by the vehicle.

Figure 2:
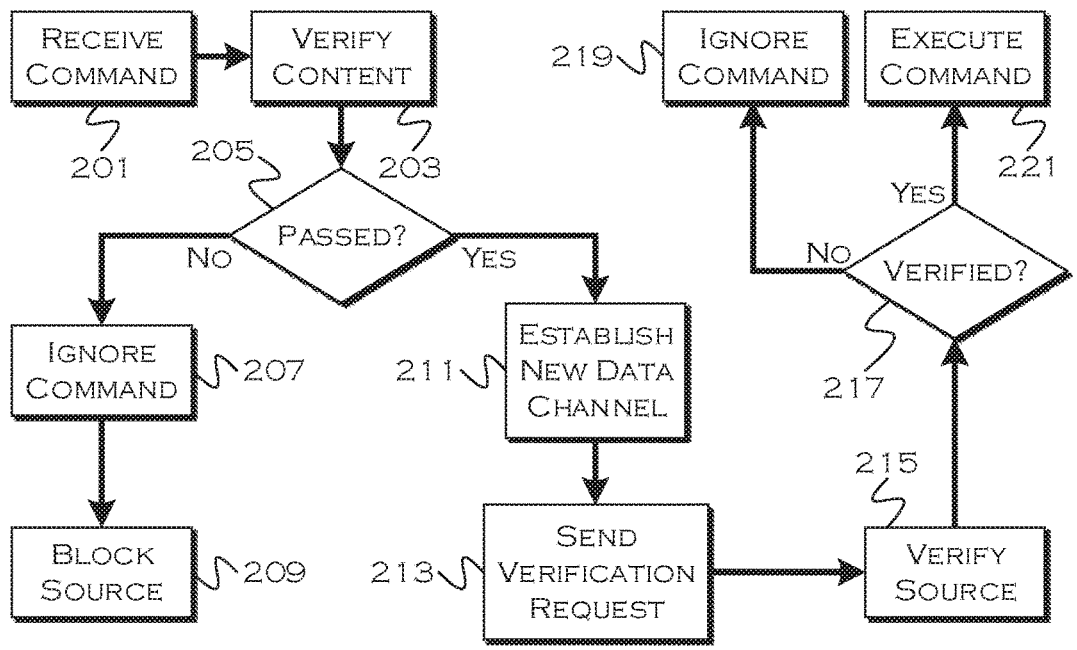
FIG. 2 shows an illustrative process for command-source verification.

FIG. 2 shows an illustrative process for command-source verification. With respect to the illustrative embodiments described in this figure, it is noted that a general purpose processor may be temporarily enabled as a special purpose processor for the purpose of executing some or all of the exemplary methods shown herein. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

In this illustrative example, the process first receives a command 201 to control, configure, alter, or otherwise interact with a vehicle module, a system, a sub-system, data, a computing unit, etc. Before opening the second channel to a command source, the system can first attempt to verify the content of the command 203. This could include, for example, security certificate verification, IP source address verification, SMS source address verification, caller ID verification, etc. Unfortunately, this verification could fail to reveal the command legitimacy as a hacker could spoof the verified data content or replay the command.

If the content cannot be verified 205, the system can ignore the command 207 and block the source 209, if desired. If the content is verified, the process continues verification to ensure that the initial content verification was not in error. In this illustrative example, the process establishes a new data channel 211 with the identified or known source of the command 211. This new channel is separate from the channel used to receive the command, preventing interception of a verification request sent on the same channel as the receiving channel. A new verification request can be sent, which can include, for example, timestamps, command information, command content, etc. 213.

Once the remote source (such as, but not limited to, a call center or other server or similar system) verifies that the command originated from the source 215, the process can confirm the source as verified 217. Verification can include checking a history of sent commands, confirming a key associated with a command, confirming communication with a vehicle (e.g., was communication sent, was it sent at an identified time, verifiable by a timestamp, etc.), etc. If the source is verified, the command can be executed 221, otherwise the command can be ignored 219.

Figure 3:
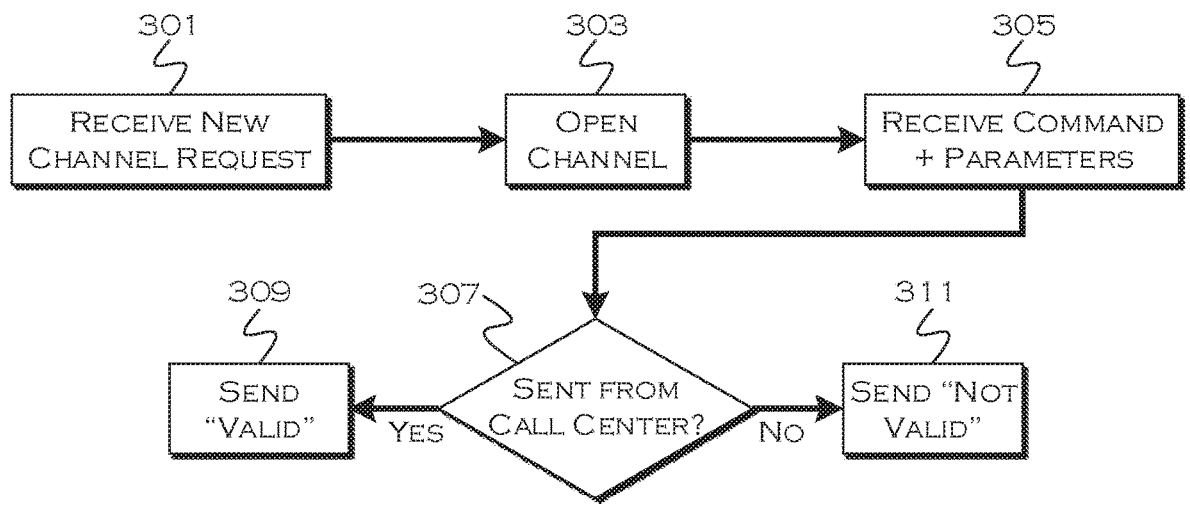
FIG. 3 shows an illustrative response process for a command-source verification request.

FIG. 3 shows an illustrative response process for a command-source verification request. With respect to the illustrative embodiments described in this figure, it is noted that a general purpose processor may be temporarily enabled as a special purpose processor for the purpose of executing some or all of the exemplary methods shown herein. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

In this illustrative example, a known source (known to the vehicle as the source, a possible source, or an identified source, for example) executes a process for verifying that the known source was the origin of a particular command. In response to a command having been sent to a vehicle telematics system, the vehicle opens a new communication channel to a supposedly originating source, and the new channel request is received at the source 301. A new communication channel, distinct from the channel over which the request was received, is opened 303. Then, in this example, the command, parameters of the command, and/or any identifying information needed to verify the source is received by the source 305. In some examples, it may be possible to simply ask the source "did you send a command to this particular (identified) vehicle?," before transmitting any additional information, and if the answer is "no," the inquiry can end. In other examples, the command, command parameters, a vehicle identifier and/or other data may be transmitted and received 305 for verification purposes.

If the source can confirm that the source was the origination point for the command (or at least a relay point for an approved command originating elsewhere) 307, the process can confirm the validity of the command 309. Otherwise, the process can report that the command was not originated from the purported source 311.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system comprising:
a processor configured to:
wirelessly receive a vehicle system command from a remote source over a first communication channel;
responsive to receiving the command, open a second communication channel with an apparent command-originating source;
request, over the second communication channel, verification that the command originated from the apparent command-originating source; and
execute the command responsive to command-origin verification.

2. The system of claim 1, wherein the apparent command-originating source is a previously stored known source of commands.

3. The system of claim 1, wherein the apparent command-originating source is identified as part of data received in conjunction with the command.

4. The system of claim 1, wherein the command includes a request to control a vehicle system.

5. The system of claim 1, wherein the command includes a request to access vehicle data.

6. The system of claim 1, wherein the command includes a request to configure a vehicle system.

7. The system of claim 1, wherein the processor is further configured to send command data, related to the vehicle system command, as part of the verification request.

8. The system of claim 7, wherein the command data includes a timestamp.

9. A system comprising:
a processor configured to:
request origin verification of a control command wirelessly received over a first channel, over a second channel established with an apparent origin responsive to receipt of the control command; and
execute the control command upon verification from the apparent origin.

10. The system of claim 9, wherein the apparent origin is identified by data received with the control command.

11. The system of claim 9, wherein the apparent origin is a previously stored known source of control commands.

12. The system of claim 9, wherein the control command includes a request to control a vehicle system.

13. The system of claim 9, wherein the control command includes a request to access vehicle data.

14. The system of claim 9, wherein the control command includes a request to configure a vehicle system.

15. A computer-implemented method comprising:
receiving a command origin verification request, to verify a command wirelessly received by a vehicle, over a wireless communication channel at a remote command originating source;
receiving command-identifying data, as part of the verification request, relating to the command;
determining if the command was sent from the remote command originating source, based on the command-identifying data; and
verifying the command origin as the remote command originating source, contingent upon the determining.

16. The method of claim 15, wherein the command-identifying data includes a timestamp.

17. The method of claim 15, wherein the command-identifying data includes data identifying the vehicle.

18. The method of claim 15, wherein the command-identifying data includes command content.

19. The method of claim 15, wherein the determining includes checking a history of sent commands to determine if the command is contained in the history and was sent to the vehicle.

20. The method of claim 15, wherein the determining includes checking a history of communication to determine if communication was sent at a time corresponding to a timestamp included with the command-identifying data.

* * * * *